United States Patent
Bonduel et al.

(10) Patent No.: US 6,614,256 B2
(45) Date of Patent: Sep. 2, 2003

(54) PROCESSES AND DEVICES FOR MONITORING THE ROTATION OF DC ELECTRIC MOTORS

(75) Inventors: Pascal Bonduel, Bouzy la Foret (FR); Jean Levine, Paris (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/805,054

(22) Filed: Mar. 14, 2001

(65) Prior Publication Data

US 2002/0008537 A1 Jan. 24, 2002

(30) Foreign Application Priority Data

Mar. 15, 2000 (FR) .............................. 00 03300

(51) Int. Cl.$^7$ .............................................. G01R 31/34
(52) U.S. Cl. .................................... 324/772; 324/158.1
(58) Field of Search ............................ 324/545, 758.1, 324/546, 772; 318/490; 322/99

(56) References Cited

U.S. PATENT DOCUMENTS

| | | | | |
|---|---|---|---|---|
| 4,467,260 A | * | 8/1984 | Mallick et al. | 318/800 |
| 4,744,041 A | * | 5/1988 | Strunk et al. | 702/84 |
| 4,745,563 A | * | 5/1988 | Kaku et al. | 318/636 |
| 5,291,128 A | * | 3/1994 | Shekar et al. | 318/490 |
| 5,801,504 A | * | 9/1998 | Endo et al. | 318/434 |

FOREIGN PATENT DOCUMENTS

| | | |
|---|---|---|
| FR | 2769428 | 4/1999 |
| WO | 9102401 | 2/1991 |

OTHER PUBLICATIONS

"Unkonventionelle Drehzahlmessung Und–Regelung BEI Gleichstrommotoren Switched–Capacitor–Filter Bestimmt Dre Hzahl Aus Der Welligkeit" Elektronik, vol. 33, No. 25, Dec. 1, 1984, pp 71–72.

* cited by examiner

Primary Examiner—Kamand Cuneo
Assistant Examiner—Tung X. Nguyen
(74) Attorney, Agent, or Firm—Liniak, Berenato & White

(57) ABSTRACT

A process for monitoring the rotation of a DC electric motor, wherein the voltage and the intensity of the current supplying the motor are measured in a manner sampled over time and wherein, for each sampling instant $t_n$, an estimate $\theta_n$, of the angular position is calculated as a function of a determined or known position for a previous sampling instant and of an estimate of a value of angular speed between these two instants, which is dependent on the voltage and on the intensity of current measured for the sampling instant $t_n$, and/or for one or more previous sampling instants.

22 Claims, 2 Drawing Sheets

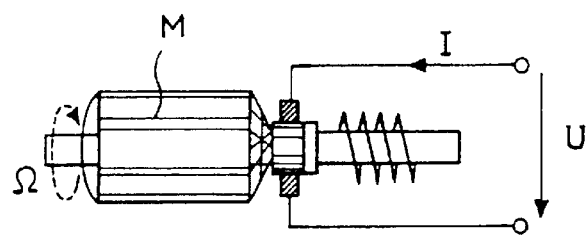
FIG_1
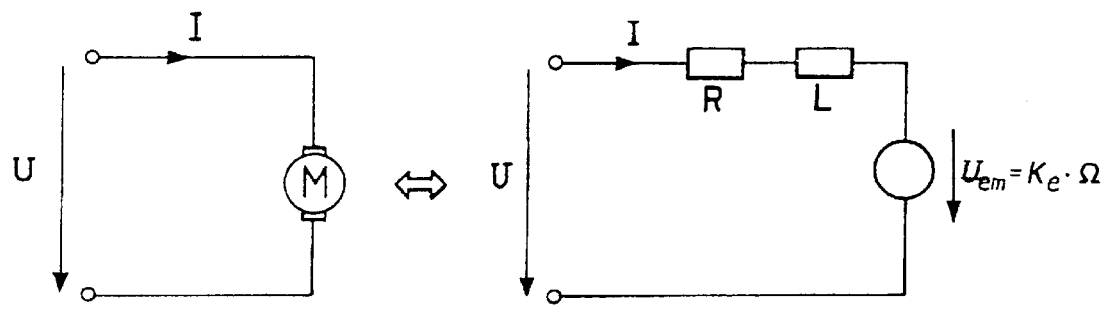
FIG_2

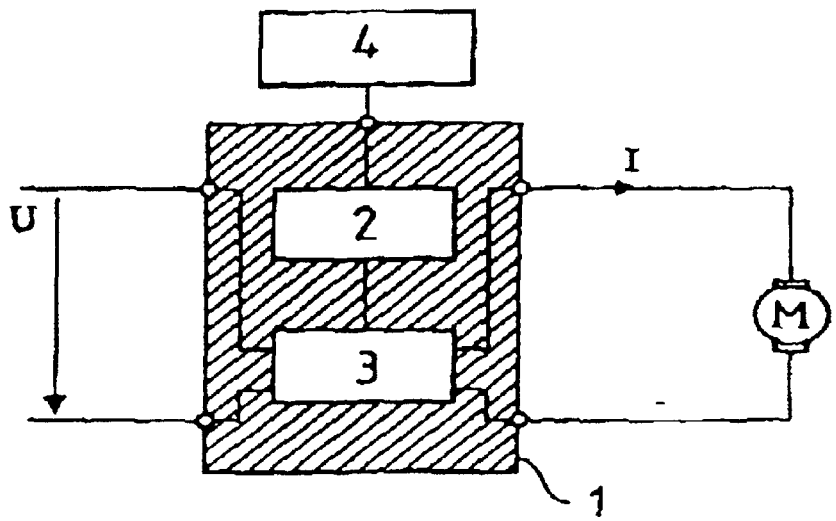
FIG_3
FIG_4

PROCESSES AND DEVICES FOR MONITORING THE ROTATION OF DC ELECTRIC MOTORS

BACKGROUND OF THE INVENTION

1. Field of the Invention

The present invention relates to processes and devices for monitoring the rotation of DC electric motors.

More particularly, the invention advantageously finds an application in respect of electric controls in motor vehicles and in particular in respect of the monitoring of the position and of the speed of an openable panel (electric window, sunroof panel, sliding door, etc.) controlled electrically with the aid of a DC electric motor or else in respect of the control of electric motors for ventilation, air-conditioning or heating of passenger compartments.

2. Description of Related Art

To date, the management of the position of a mechanism with DC motor is generally performed by one of the following means:

use of angular or linear incremental sensors (Hall effect for example) and counting of the pulses from the sensor,
detection of the end of travel positions (or the like) by sensors (electromechanical switches, inductive switches, etc.),
detection of mechanical abutments by measuring the current consumed.

The first solution has the drawback of requiring the use of expensive sensors.

Furthermore, the accuracy of the position thus determined is entirely dependent on the structure of the sensor and can vary greatly from one sensor to another.

Moreover, whereas one knows accurately the position which one seeks to determine at the instant at which a pulse is triggered, this position is known only rather inaccurately between each pulse.

The second solution has the drawback of requiring, likewise, the use of expensive sensors and of not allowing accurate determination of position between the markers of the sensors.

The third solution requires the use of mechanical abutments and detection of jamming current. The requirement of jamming in respect of detection gives rise to expensive dimensioning of the mechanical members which have to withstand the jamming stresses. Furthermore, here again, the position is uncontrolled between the positions of abutment.

SUMMARY OF THE INVENTION

An aim of the invention is to propose a solution which is reliable and economical and which makes it possible to accurately monitor the position of a movable element, and to do so over its entire travel.

Accordingly, it proposes a process for monitoring the rotation of a DC electric motor, wherein the voltage and the intensity of the current supplying said motor are measured in a manner sampled over time and wherein, for each sampling instant $t_n$, an estimate $\theta_n$ of the angular position is calculated as a function of a determined or known position for a previous sampling instant and of an estimate of a value of angular speed between these two instants, which is dependent on the voltage and on the intensity of current measured for the sampling instant $t_n$ and/or for one or more previous sampling instants.

Advantageously, an estimate of a value of angular speed $\Omega_n$ at an instant $t_n$ is calculated from the equation:

$$\Omega_n = \frac{(U_n - RI_n)}{Ke}$$

where $U_n$ and $I_n$ are the measured values of the voltage and the intensity of the supply current at the sampling instant, where R corresponds to the equivalent resistance of the motor, where $K_e$ is the parameter of proportionality between the speed of rotation of the shaft of the motor and the electromotive force generated by the rotation.

In particular, in respect of an instant $t_n$, an estimate $\theta_n$ of the angular position is determined by:

$$\theta_n - \theta_{n-1} = \left(\frac{\Omega_n + \Omega_{n-1}}{2}\right)(t_n - t_{n-1})$$

where n−1 is the index of the sampling instant $t_{n-1}$ just prior to the instant $t_n$.

According to one possible mode of implementation, during a startup, an estimate of the value of the resistance R is determined by calculating:

$$R = a \times \frac{U}{I_{peak}}$$

where $I_{peak}$ is the maximum intensity of current measured during a startup, U is the measured supply voltage corresponding to this intensity of current, and a is a given coefficient.

According to another mode of implementation, an estimate of the value of the resistance R is determined by calculating:

$$R = \frac{1}{\int_{1}^{t2} I \, dt}\left(\int_{1}^{t2} U \, dt - Ke\sigma\right)$$

where σ is the angle which separates the positions corresponding to two markers of determined positions, t1 and t2 corresponding to the two instants at which these two markers are crossed. In particular then, to determine this estimated value, one calculates:

$$R = \frac{1}{\sum_{m=t1}^{t2} I_n \cdot \Delta t}\left(\sum_{t=t1}^{t2}(U_n \cdot \Delta t - Ke\sigma)\right)$$

where
In is the sampled value of the current for t=tn
Un is the sampled value of the voltage for t=tn
and where Δt is the sampling period.

Preferably, an estimate of the temperature of the electric motor is determined as a function of the estimate of the value of the resistance R and, according to the value of the temperature thus estimated, the supply to the electric motor is cut.

A device in accordance with the invention comprises measuring means and calculating means for implementing the aforesaid process.

Preferably, the calculating means comprise a microcontroller which drives the electric motor.

Advantageously, this device comprises means for, as a function of the speed and of the angular position which are calculated at each sampling instant, controlling the electric motor so as to avoid excessive pinchings.

As a variant or as an adjunct, it comprises means for, as a function of the speed and of the angular position which are calculated at each sampling instant, speed-slaving the movement of the openable panel.

As a variant or as an adjunct likewise, it comprises means for, as a function of the speed and of the angular position which are calculated at each sampling instant, controlling the electric motor in such a way as to obtain accurate positioning of the openable panel.

Another object of the invention is to propose a system for controlling motor vehicle openable panels comprising a DC electric motor, which comprises a device of the aforesaid type.

BRIEF DESCRIPTION OF THE DRAWINGS

Other characteristics and advantages of the invention will become further apparent from the following description, which is purely illustrative and nonlimiting and which should be read in conjunction with the appended figures in which:

FIG. 1 is a diagram illustrating the supplying of a motor by means of a device in accordance with a possible embodiment of the invention;

FIG. 2 consists of two electrical diagrams and illustrates the electrical modeling which may be undertaken of a DC motor;

FIG. 3 is a diagram of an arrangement comprising a device in accordance with one embodiment of the invention;

FIG. 4 is a graph on which has been plotted the profile over time of the intensity of the current supplying a DC motor of the type of FIG. 2.

DETAILED DESCRIPTION OF PREFERRED EMBODIMENTS

Represented in FIG. 1 is an electric motor M supplied by a supply current of intensity I by means of a supply voltage U and whose shaft revolves at a speed of rotation $\Omega$.

It is known, as illustrated by FIG. 2, that such an electric motor can be modeled electrically by:

$$L\frac{dI}{dt} = U = R \cdot I - K_e \Omega$$

where L and R are the inductance and the resistance of the motor and where $K_e$ is a parameter peculiar to the motor (parameter of proportionality between the speed of rotation of the shaft of the motor and the electromotive force generated by the rotation).

As represented in FIG. 3, a possible device 1 for estimating the angular position of the shaft of the motor M comprises a microcontroller 2 associated with input/output electronics 3 which make it possible to read the current intensity I and the supply voltage U of the motor M.

The microcontroller 2 is advantageously the microcontroller used to control the motor M and accordingly is linked to the various controls on which the user may act (block 4).

Under this assumption, the electronics 3 advantageously comprise an inverter block for driving the motor.

The reading of U and of I is performed with a given sampling over time, for example with a periodic sampling.

For each sampling, an estimate of the speed of rotation of the motor is calculated through the equation:

$$\Omega_n = \frac{(U_n - RI_n)}{Ke}$$

and an estimate of the angular position $\theta_n$ of the motor is calculated through the equation:

$$\theta_n - \theta_{n-1} = \left(\frac{\Omega_n + \Omega_{n-1}}{2}\right)(t_n - t_{n-1})$$

where $t_n$ designates the instant of the nth sampling.

Accordingly, the microcontroller 2 comprises memory means in which are stored the quantities R and Ke assumed to be known at the moment of the calculation.

It will be noted that this method of calculation is merely intended to be approximate, the quantity LdI/dt being neglected.

Furthermore, the quantities R and Ke may vary over time, in particular as a function of the external temperature of the environment in which the motor is located. This is especially true in the case of the equivalent resistance R.

To refine the measurement, it is possible to estimate the resistance R during the motor startup phase.

During the motor startup phase, the curve of current intensity exhibits a shape such as the one illustrated in FIG. 4.

This shape is characterized by a startup peak (current intensity $I_{peak}$) which occurs a very short time ($t_{peak}-t_0$) after the motor is started.

This current $I_{peak}$ depends in practice on U and on R through the relation $$I_{peak} = a\frac{U}{R}$$

where a is a coefficient less than 1, peculiar to each motor.

Measurement of $I_{peak}$ at each startup enables the microcontroller 2 to estimate the value of the resistance.

$$R = a\frac{U}{I_{peak}}$$

This value of R is stored and used when estimating the speed and the angular position of the motor.

Other methods of estimating the resistance R are possible.

In particular, in the case where two reliable pieces of position information are available (referred to as markers hereinafter and obtained for example by means of two mechanical switches tripped when the movable element takes two given positions, of two pulses from an incrementation sensor, etc.), a method of recalibrating the resistance R is as follows.

It is known that $$\Omega = \frac{U - RI}{Ke}$$

If this formula is integrated between the two markers a distance $\sigma$ apart, we obtain $$\sigma = \int_1^{t_2} \Omega dt = \int_1^{t_2} \frac{U - RI}{Ke} dt$$

whence $$R = \frac{1}{\int_1^{t2} I\,dt}\left(\int_1^{t2} U\,dt - Ke\sigma\right)$$

where t1 is the instant at which the marker 1 is crossed, t2 is the instant at which the marker 2 is crossed, σ is the angle which separates the positions corresponding to the two markers.

If the system has not stopped between the two markers and is in a quasi-static state, with slow variations between these, we then have, by accumulating the values of I and U measured by sampling:

$$R = \frac{1}{\sum_{tn=t1}^{t2} I_n \cdot \Delta t}\left(\sum_{t=t1}^{t2}(U_n \cdot \Delta t) - Ke\sigma\right)$$

where
In is the sampled value of the current for t=tn
Un is the sampled value of the voltage for t=tn
and where Δt is the sampling period.

It will be noted that R varies over time, in particular as a function of the external temperature of the environment in which the motor is located.

The calculation of R is advantageously used to, for example as a function of precalibrated charts, yield information regarding the temperature of the electric motor.

The microcontroller 2 cuts the supply to said motor when the temperature thus determined is greater than a threshold value and might produce a deterioration during use.

It will be noted that the speed and position determinations carried out by the microcontroller 2 are advantageously used in systems for the electrical control of motor vehicle openable panels for example to control provisions for protecting against excessive pinchings (reversing of the electric motor when its speed tends to zero although the openable panel is not at the end of travel) or else to speed-slave the controlled openable panel or else to control its accurate positioning in particular at the end of travel.

What is claimed is:

1. A process for monitoring the rotation of a DC electric motor, comprising the steps of:
   measuring a voltage and an intensity of a current supplying said motor in a manner sampled over time, and
   calculating, for each sampling instant tn, an estimate θn of the angular position as a function of a known position for a previous sampling instant tn and of an estimate of a value of angular speed between these two instants,
   wherein an inductance of the motor is neglected and the value of angular speed $\Omega_n$, the voltage $U_n$ and the intensity current $I_n$ measured for the sampling instant $t_n$ have the relationship $$\Omega_n = \frac{(U_n - RI_n)}{Ke}$$

where $K_e$ is the parameter of proportionality between a speed of rotation of a shaft of the motor and an electromotive force generated by the rotation, and
R corresponds to the equivalent resistance of the motor, wherein said equivalent resistance R is estimated from said measurements in order to take into account variations of external temperature of the environment in which the motor is located.

2. The process as claimed in claim 1, wherein, in respect of the sampling instant $t_n$, an estimate $\theta_n$ of the angular position is determined by:

$$\theta_n - \theta_{n-1} = \left(\frac{\Omega_n + \Omega_{n-1}}{2}\right)(t_n - t_{n-1})$$

where n−1 is an index of the sampling instant $t_{n-1}$ just prior to the sampling instant $t_n$.

3. A device for monitoring the rotation of a DC electric motor, which comprises means for measuring the voltage and the intensity of the current supplying the motor in a manner sampled over time, as well as calculating means which monitors the rotation of said DC electric motor according to the process according to claim 1.

4. A system controlling motor vehicle openable panels comprising a DC electric motor, which comprises a device for monitoring the rotation of a DC electric motor, which comprises means for measuring the voltage and the intensity of the current supplying the motor in a manner sampled over time, as well as calculating means which implement the process according to claim 1.

5. A device for monitoring the rotation of a DC electric motor, which comprises means for measuring the voltage and the intensity of the current supplying the motor in a manner sampled over time, as well as calculating means which implement the process according to claim 1.

6. The process as claimed in claim 2, wherein, during a startup, an estimate of the value of the resistance R is determined by calculating:

$$R = a \cdot \frac{U}{I_{peak}}$$

where $I_{peak}$ is the maximum intensity of current measured during a startup, U is the measured supply voltage corresponding to this intensity of current, and a is a given coefficient.

7. The process as claimed in claim 2, wherein an estimate of the value of the resistance R is determined by calculating:

$$R = \frac{1}{\int_1^{t2} I\,dt}\left(\int_1^{t2} U\,dt - Ke\sigma\right)$$

where σ is an angle which separates the positions corresponding to two markers of determined positions, t1 and t2 corresponding to the two instants at which these two markers are crossed.

8. The device as claimed in claim 2, wherein the calculating means comprise a microcontroller which drives the electric motor.

9. A device for monitoring the rotation of a DC electric motor, which comprises means for measuring the voltage and the intensity of the current supplying the motor in a manner sampled over time, as well as calculating means which implement the process according to claim 2.

10. The system as claimed in claim 4, which comprises means for, as a function of the speed and of the angular position which are calculated at each sampling instant, controlling the electric motor so as to avoid excessive pinchings.

11. The system as claimed in claim 4, which comprises means for, as a function of the speed and of the angular position which are calculated at each sampling instant, speed-slaving the movement of the openable panel.

12. The system as claimed in claim 4, which comprises means for, as a function of the speed and of the angular position which are calculated at each sampling instant, controlling the electric motor in such a way as to obtain accurate positioning of the openable panel.

13. The process as claimed in claim 6, wherein an estimate of a temperature of the electric motor is determined as a function of the estimate of the value of the resistance R and wherein, according to the value of the temperature thus estimated, the supply to the electric motor is cut.

14. A device for monitoring the rotation of a DC electric motor, which comprises means for measuring the voltage and the intensity of the current supplying the motor in a manner sampled over time, as well as calculating means which implement the process according to claim 6.

15. The device as claimed in claim 6, wherein the calculating means comprise a microcontroller which drives the electric motor.

16. The process as claimed in claim 7, wherein, to determine this estimated value, one calculates:

$$R = \frac{1}{\sum_{tn=t1}^{t2} I_n \cdot \Delta t} \left( \sum_{t=t1}^{t2} (U_n \cdot \Delta t) - Ke\sigma \right)$$

where

In is the sampled value of the current for t=tn
Un is the sampled value of the voltage for t=tn
and where Δt is the sampling period.

17. The process as claimed in claim 7 wherein an estimate of the temperature of the electric motor is determined as a function of the estimate of the value of the resistance R and wherein, according to the value of the temperature this estimated, the supply to the electric motor is cut.

18. A device for monitoring the rotation of a DC electric motor, which comprises means for measuring the voltage and the intensity of the current supplying the motor in a manner sampled over time, as well as calculating means which implement the process according to claim 7.

19. A system for controlling motor vehicle openable panels comprising a DC electric motor, which comprises a device according to claim 8.

20. A device for monitoring the rotation of a DC electric motor, which comprises means for measuring the voltage and the intensity of the current supplying the motor in a manner sampled over time, as well as calculating means which implement the process according to claim 13.

21. The process as claimed in claim 16, wherein an estimate of the temperature of the electric motor is determined as a function of the estimate of the value of the resistance R and wherein, according to the value of the temperature this estimated, the supply to the electric motor is cut.

22. A device for monitoring the rotation of a DC electric motor, which comprises means for measuring the voltage and the intensity of the current supplying the motor in a manner sampled over time, as well as calculating means which implement the process according to claim 16.

* * * * *